United States Patent [19]
Woog

[11] Patent Number: 5,229,009
[45] Date of Patent: * Jul. 20, 1993

[54] EFFLUENT PRECIPITATION AND NEUTRALIZATION CHAMBER

[76] Inventor: Gunter Woog, 5435 Bauers Dr., West Bend, Wis. 53095

[*] Notice: The portion of the term of this patent subsequent to Jul. 21, 2009 has been disclaimed.

[21] Appl. No.: 894,251

[22] Filed: Jun. 8, 1992

Related U.S. Application Data

[63] Continuation of Ser. No. 655,127, Feb. 8, 1991, Pat. No. 5,132,022.

[51] Int. Cl.⁵ .............................................. C02F 1/66
[52] U.S. Cl. ...................... 210/719; 75/713; 75/733; 210/724; 210/738; 210/199; 210/207; 210/248; 210/912; 210/919; 266/170
[58] Field of Search ..................... 75/713, 733, 741; 210/702, 714, 719, 724, 738, 198.1, 199, 202, 205–205, 232, 912, 919, 248; 266/170; 430/399, 400

[56] References Cited

U.S. PATENT DOCUMENTS

| | | |
|---|---|---|
| 1,353,805 | 5/1934 | Pegler et al. |
| 2,263,398 | 11/1941 | Robinson ................... 210/207 |
| 3,099,623 | 7/1963 | Kaufer ....................... 210/167 |
| 3,369,801 | 2/1968 | Hartman ................... 266/170 |
| 3,541,008 | 11/1970 | Spinola ..................... 210/721 |
| 3,792,845 | 2/1974 | Larson et al. ............. 266/170 |
| 3,794,171 | 2/1974 | Kimura et al. ............ 210/205 |
| 4,100,071 | 7/1978 | Beurer et al. ............. 210/197 |
| 4,240,617 | 12/1980 | MacKay ................... 210/170 |
| 4,331,473 | 5/1982 | King, Jr. .................... 75/109 |
| 4,441,697 | 4/1984 | Peterson et al. .......... 266/170 |
| 4,608,177 | 8/1986 | Woog ........................ 210/738 |
| 4,662,613 | 5/1987 | Woog ........................ 266/170 |
| 4,854,552 | 8/1989 | Williams .................. 266/170 |
| 4,997,166 | 3/1991 | Wiggins .................... 266/170 |
| 5,026,029 | 6/1991 | Peterson .................. 266/170 |
| 5,132,022 | 7/1992 | Woog ........................ 210/719 |

Primary Examiner—Peter Hruskoci
Attorney, Agent, or Firm—Ryan, Kees & Hohenfeldt

[57] ABSTRACT

An effluent precipitation and neutralization chamber for mixing and neutralizing spent photographic developer and fixer. A baffle and long folded ribbons inside the chamber promote mixing of the developer and fixer. A source of iron ions such as fine steel wool is immersed in the fluids. Ion exchange between the steel wool and the photographic fixer recovers silver from the fixer. The desilvered fluid is diluted with wash water before it is discharged from the chamber. A wash water inlet tube is directly aligned with the discharge outlet opening in the chamber so that wash water can flow almost directly into the outlet tube to dilute the mixed and neutralized developer and fixer.

6 Claims, 1 Drawing Sheet

EFFLUENT PRECIPITATION AND NEUTRALIZATION CHAMBER

CROSS REFERENCE TO RELATED APPLICATION

This application is a continuation of copending application Ser. No. 07/655,127 filed Feb. 8, 1991 now U.S. Pat. No. 5,132,022.

BACKGROUND OF THE INVENTION

This invention pertains to waste processing, and more particularly to apparatus for treating and disposing of spent photographic fixer and developer chemicals and removing remaining traces of silver therefrom.

The present invention is a further development of the effluent precipitation and neutralization chamber described in Woog, U.S. Pat. No. 4,608,177. In the apparatus of the '177 patent, spent photographic fixer and spent photographic developer are mixed together in a closed chamber. To assure proper mixing of the spent fixer and developer, the chamber includes a pre-mixing vessel, and the chamber is filled with a material that causes the fluids to flow in a tortuous path. The spent fixer, which is normally acidic in nature, having a pH of about 4.5, is neutralized by the alkaline developer, which normally has a pH of about 10.5. As a result, iron in the fixer in the form of ferrous oxide is precipitated as fine particles, and a relatively neutral and clear liquid is discharged from the chamber to a drain. The iron precipitate is periodically cleaned from the chamber for proper disposal.

This invention relates to improvements over the apparatus set forth above and to solutions to the problems raised or not solved thereby.

SUMMARY OF THE INVENTION

In accordance with the present invention, a chamber having a simplified, economical construction is provided.

Another aspect of the present invention involves providing an effluent precipitation and neutralization chamber which enables reduction of any residual silver contact in the spent photochemicals. The apparatus of this invention includes a mixing baffle that prevents back up of the reaction products into the inlets, thereby preventing damage to the photographic developing equipment. Further, a source of iron ions placed in the path of photochemical flow through the chamber.

The effluent precipitation and neutralization chamber of the present invention comprises a hollow vessel having an open top. A removable cover fits tightly over the vessel open top. Both the vessel bottom wall and the cover are flat to allow stacking of other devices on top of the chamber.

The vessel has two chemical inlet ports, one for introducing spent photographic developer and the other for introducing spent photographic fixer into the vessel. The inlet ports are preferably close to each other and to the open top of the vessel.

The effluent precipitation and neutralization chamber further has a third inlet port for introducing wash water and an outlet port for discharging treated fluid. The wash water inlet port and the outlet port are lower than and on the opposite side of the vessel from the fixer and developer inlet ports.

The invention provides an effluent precipitation and neutralization chamber for treating spent photographic fixer and developer that includes a vessel having a wall, preferably cylindrical, and an open top provided with a removable cover. Inlet means are provided in the vessel wall for introducing spent photographic developer and fixer into the vessel. An outlet for treated fluids is provided in the vessel wall. A tortuous flow path for flow of the developer and fixer within the vessel from the inlet means to the outlet is provided by means in the vessel including a length of flexible ribbon defining the flow path through the vessel between the inlet and the outlet to provide thorough mixing of the developer and fixer as they flow from the inlet to the outlet to thereby neutralize the developer and fixer.

A wash water inlet in the vessel wall is proximate to and aligned with the outlet for introducing wash water into the vessel to dilute the mixed photographic developer and fixer discharged from the vessel through the outlet. The outlet is formed by an outlet tube extending through the vessel wall. The wash water inlet includes a tube extending through the vessel wall and terminating in an open end that faces and is proximate the open end of the outlet tube, so that wash water can flow directly from the wash water inlet tube into the outlet tube to dilute the mixed photographic developer and fixer discharged through the outlet tube.

The chamber preferably includes a source of iron ions, such as steel wool, to exchange silver ions in the fixer for iron ions from the source of iron ions, so that silver is recovered within the vessel from the photographic fixer. If desired, steel wool or iron screening material can be placed among the flow restricting ribbons. Neutralization of the inflow fluids in the present devices aids in preserving the steel wool, which otherwise can rapidly be eroded by acids in the fixer solution. The neutralized fluid flowing through the steel wool, thereby promotes iron-for-silver ion exchange by known chemical reactions. Periodically the chamber cover is opened to remove the ferrous oxide and silver precipitates and clean the vessel and ribbons of other coatings such as gelatinous materials. In that manner, the effluent precipitation and neutralization chamber functions as a single point of service discharge for all of the chemicals from a film processing machine.

A further aspect of the invention involves providing a means for visually observing when the device is becoming backed up due to undue amounts of sediments. A still further aspect involves providing a valve for removal of periodic effluent samples from the device to assist in monitoring its performance.

Other advantages, benefits, and features of the invention will become apparent hereinafter to those skilled in the art.

DESCRIPTION OF THE PREFERRED EMBODIMENT

Figure 1:
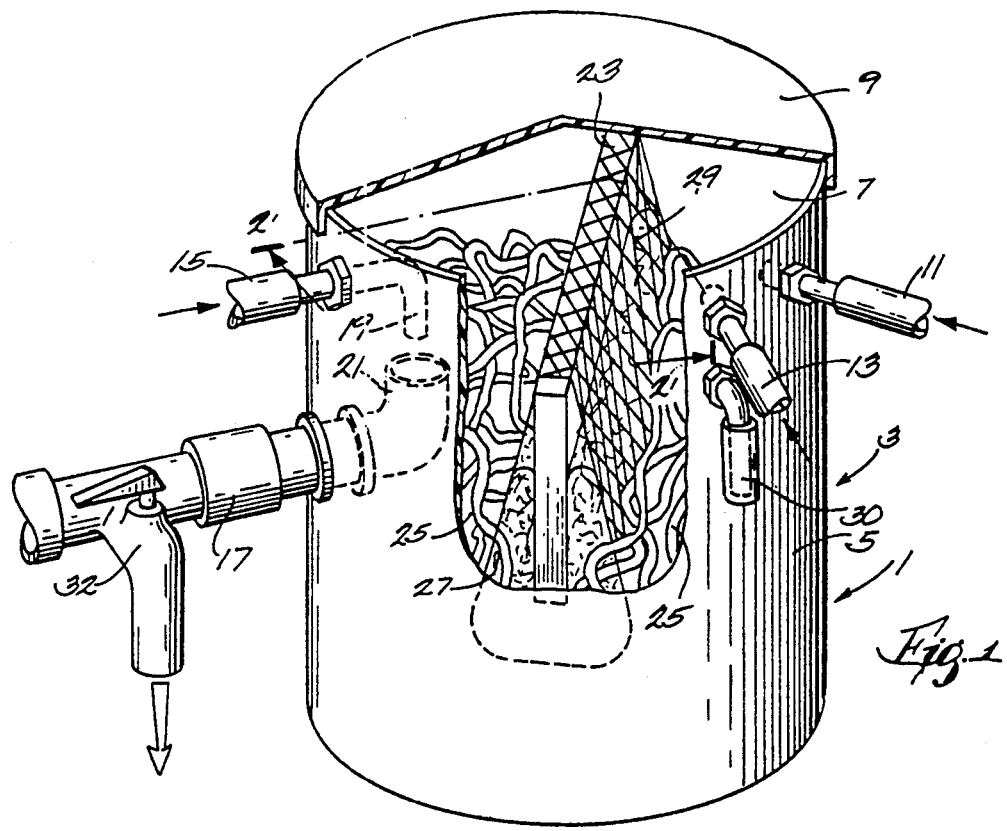
FIG. 1 is a perspective view of an effluent precipitation and neutralization chamber, partially broken away, constructed according to a preferred embodiment of the present invention; and, FIG. 2 is a sectional view taken along offset line 2—2 of FIG. 1.
Figure 2:
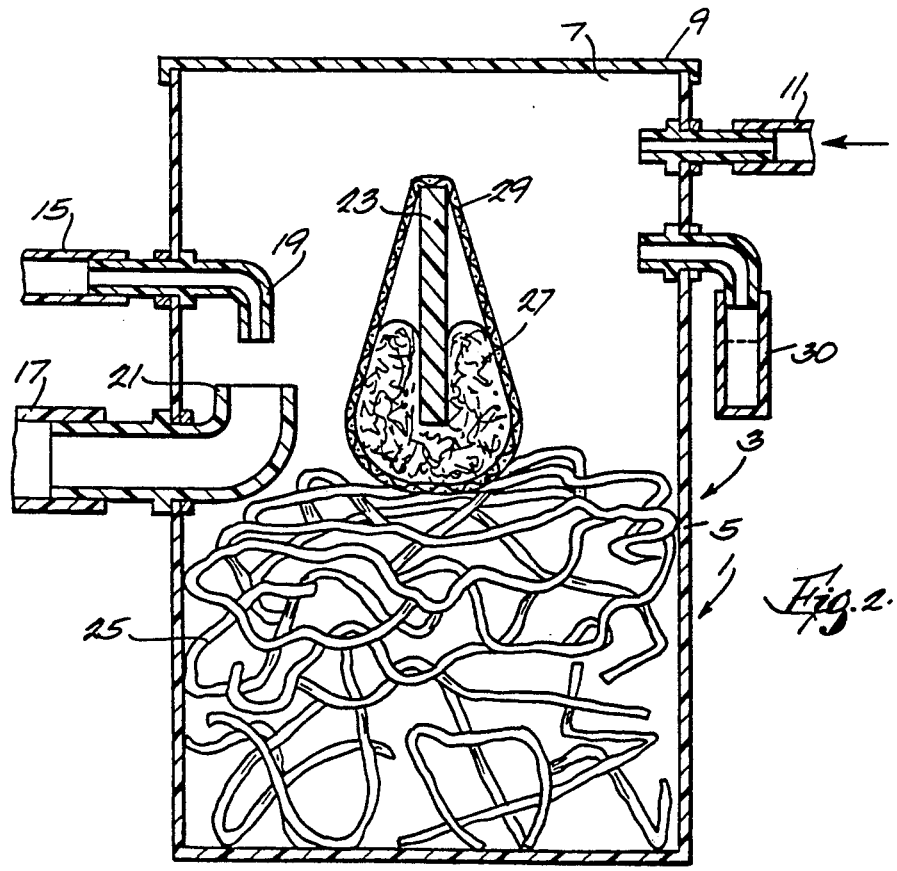

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

The effluent precipitation and neutralization chamber disclosed herein is particularly useful for treating spent chemicals from film processing operations. It will be understood, however, that the invention is not limited to photographic applications.

Referring to the drawing, according to the invention, an effluent precipitation and neutralization chamber 1 is constructed of a hollow vessel 3 having a side wall 5, a flat bottom wall (not shown), and an open top 7. A flat cover 9 fits tightly on the vessel open top 7, but the cover is removable. The flat bottom wall and flat cover 9 enable other devices to be stacked on the top of the chamber 1.

The vessel wall 5 is formed with two fluid inlet ports that preferably are located close to each other and near the vessel open top 7. Through one inlet port passes a suitable tube 11 that introduces spent photographic fixer into the vessel 3. A similar tube 13 passes through the vessel wall at the second inlet port to introduce spent photographic developer into the vessel.

A third inlet port is formed in the vessel wall 5 at a considerable circumferential distance from the first and second inlet ports preferably on the opposite side of the vessel. A tube 15 passes through the vessel wall at the third inlet port to bring wash water into the vessel 3. Another tube 17 passes through the vessel wall at a fourth port. Preferably, the tubes 15 and 17 are vertically aligned. The tube 17 serves as the outlet for the fluids introduced into the chamber 1 from the inlet tubes 11, 13, and 15.

In the embodiment shown, the tubes 15 and 17 terminate in respective right angle elbows 19 and 21, the open ends of which face each other, the open end of elbow 19 facing downward while the open end of elbow 21 faces upward. In that manner, wash water from the tube 15 can flow and flush downward into the outlet tube 17 to dilute the discharge fluid and wash away sediment from the outflow.

In order for the spent fixer and developer from the inlet tubes 11 and 13, respectively, to reach the outlet tube 17, the fixer and developer must flow under a baffle 23. The baffle 23 extends diametrically across the chamber vessel 3 between the inlet tubes 11 and 13 and the wash water tube 15 and outlet tube 17. The baffle promotes mixing of the fixer and developer as they flow through the vessel 3. Preferably the vessel 1 is formed from a plastic material, and baffle 23 may be formed from foamed plastic such as polystyrene, but other materials such as wood or glass could be substituted. Baffle 23 can be made slightly overlength so that it can be retained in place by friction.

To further promote mixing of the fixer and developer, a quantity of flexible ribbons 25 are folded and packed within the vessel 3. The ribbons 25, which may be plastic packaging bands, generally surround the baffle 23. The ribbons present restrictions in the form of tortuous paths to the flow of the fixer and the developer from their respective inlet tubes 11 and 13 to the outlet tube 17. The ribbons and the baffle 23 thus cooperate to assure thorough mixing of the developer and fixer. Such mixing neutralizes the normally acidic fixer and the normally alkaline developer.

Spent fixer, even after undergoing a desilvering process, typically contains about 500 to 1000 parts per million of iron besides about five to 500 parts per million of silver. Hence another result of the chemical reaction between the acidic fixer and the alkaline developer is that ferrous oxide is precipitated from the fixer. The ferrous oxide settles silver particles, and gelatinous materials to the bottom of the vessel and also settle on the ribbons 25. In that manner, the fluid discharged from the outlet tube 17 is both relatively neutral in pH concentration and clear of iron precipitate. Wash water can be pumped through the tube 15 to dilute the treated fluid discharged through the outlet tube 17. Periodically, the chamber cover 9 is removed to clean the vessel 3 and the ribbons 25 of the sediment.

Further in accordance with the present invention, the effluent precipitation and neutralization chamber 1 includes a source of ferrous ions that facilitate removal of trace amounts of silver from the spent fixer. In the preferred embodiment, the source of ferrous ions is a pad 27 of fine steel wool. The steel wool pad 27 may be suspended, either by individual ties or plastic netting 29, to the baffle 23. The steel wool pad may be partly surrounded by the ribbons 25 such that the fixer and developer flowing through the ribbons also flow through and adjacent the steel wool pad. As a consequence, silver ions still remaining in the spent fixer when it enters the vessel 3 through the inlet tube 11 are exchanged for iron ions from the steel wool pad.

A visual indicator 30 can be provided to alert the operator that the chamber 1 is becoming filled with sediment. The indicator, initially empty, becomes filled with a dark fluid, which serves as a warning. A sampling valve 32 can be provided either on the outflow line 17 as shown, or on the side of chamber 1 in the vicinity of the outlet opening.

As the chamber fills with sediment, there exists a possibility that fluids can back up into the inlet lines 11 or 13, potentially damaging the other equipment to which they are connected. The present device avoids this problem by positioning of the top of baffle 23 below the level of the inlets 11 and 13. The backed up fluids will thus flow over the top of the baffle directly to outlet 21, instead.

The outstanding advantage of the effluent precipitation and neutralization chamber 1 is that it serves as a single point of service discharge for all the chemicals of a film processing machine. Further, by the principles of dilution from the wash water entering the vessel 3 through the tube 15, silver concentration can be reduced by 10 to 50 times, thereby making legal discharge limits much more obtainable than with prior treatment systems. Additional recovery of trace silver from the spent photographic fixer is another important feature of the present invention.

Thus, it is apparent that there has been provided, in accordance with the invention, an effluent precipitation and neutralization chamber that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. An effluent precipitation and neutralization chamber for treating spent photographic fixer and developer comprising a vessel having a wall and an open top;

a cover for removably covering the vessel open top;

inlet means in the vessel wall for introducing the spent photographic developer and fixer into the vessel;

an outlet in the vessel wall;

means in the vessel including a length of flexible ribbon and at least one baffle defining a tortuous flow path for flow of the developer and fixer within the vessel from the inlet means to the outlet;

said flow path through the vessel between the inlet means and the outlet providing thorough mixing of the developer and fixer as they flow from the inlet means to the outlet to thereby neutralize the developer and fixer a wash water inlet in the vessel wall proximate and aligned with the outlet for introducing wash water into the vessel to dilute the mixed photographic developer and fixer discharged from the vessel through the outlet.

the outlet comprising an outlet tube extending through the vessel wall; and the wash water inlet including a tube extending through the vessel wall and terminating in an open end that faces and is proximate the open end of the outlet tube, so that wash water can flow directly from the wash water inlet tube into the outlet tube to dilute the mixed photographic developer and fixer discharged through the outlet tube.

2. The effluent precipitation and neutralization chamber of claim 1 further comprising a source of iron ions within the vessel for reacting with the photographic fixer to exchange silver ions in the fixer for iron ions from the source of iron ions, so that silver is recovered within the vessel from the photographic fixer.

3. The effluent precipitation and neutralization chamber of claim 1 wherein the source of iron ions comprises steel wool.

4. Apparatus for treating selected chemicals comprising:

a vessel having a wall and an open top;

cover means for removably covering the vessel open top;

fluid inlets in the vessel wall for introducing at least two selected spent photographic chemicals that are reactive with each other into the vessel;

a fluid outlet in the vessel wall for discharging the chemicals from the vessel;

at least one elongated flexible ribbon located in the vessel for producing tortuous paths for the chemicals flowing between the inlet means and the outlet means to thereby promote mixing of the chemicals;

a baffle extending across the vessel between the inlet and the outlet with its top below the inlet;

steel wool in said vessel to remove residual dissolved silver from said chemicals the outlet extending through the vessel wall and having opening for outflow of mixed, reacted liquids from the vessel; and means for introducing wash water into the vessel which comprises a tube extending through the vessel wall and having an opening that faces and is proximate the outflow opening, so that wash water introduced into the vessel can flow directly into the outlet tube.

5. A method of neutralizing spent photographic fixer and reducing waste silver content thereof comprising the steps of:

introducing spent photographic developer and spent photographic fixer into a vessel through an inlet;

providing a source of iron ions within the vessel;

contacting the photographic fixer with the source of iron ions to cause an exchange of ions between the source of iron ions and the photographic fixer and thereby remove silver from the spent photographic fixer while reducing pollutant content;

mixing the spent photographic developer and spent photographic fixer within the vessel to neutralize the pH thereof by causing it to flow through a tortuous path formed by a means including at least one baffle;

providing a fluid outlet having an opening into the vessel, and positioning an inlet for the wash water proximate to and aligned with the fluid outlet so that the wash water flows directly into the outlet tube wherein said baffle extends across said vessel between said inlet and said outlet; and, discharging the mixed spent solution having reduced pollutant content through said fluid outlet while causing wash water to also flow through said outlet.

6. The method of claim 5 wherein providing a source of iron ions comprises providing fine steel wool within the vessel.

* * * * *